(12) United States Patent
Dreschel et al.

(10) Patent No.: US 12,096,728 B1
(45) Date of Patent: Sep. 24, 2024

(54) PASSIVE POROUS TUBE NUTRIENT DELIVERY SYSTEM

(71) Applicant: United States of America as Represented by the Administrator of NASA, Washington, DC (US)

(72) Inventors: Thomas W. Dreschel, Titusville, FL (US); Jacob J. Torres, Cocoa, FL (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 217 days.

(21) Appl. No.: 17/023,336

(22) Filed: Sep. 16, 2020

Related U.S. Application Data

(60) Provisional application No. 62/901,421, filed on Sep. 17, 2019.

(51) Int. Cl.
    *A01G 31/02*     (2006.01)
    *A01G 27/00*     (2006.01)
    *A01G 27/06*     (2006.01)

(52) U.S. Cl.
    CPC ........... *A01G 31/02* (2013.01); *A01G 27/008* (2013.01); *A01G 27/06* (2013.01)

(58) Field of Classification Search
    CPC .. A01G 31/02; A01G 31/00; A01G 2031/006; A01G 27/04
    USPC .......................................................... 47/64
    See application file for complete search history.

(56) References Cited

U.S. PATENT DOCUMENTS

| | | | | |
|---|---|---|---|---|
| 3,946,762 A * | 3/1976 | Green | ................... | A01G 25/06 405/44 |
| 4,310,990 A * | 1/1982 | Payne | ................... | A01G 31/02 47/62 R |
| 4,833,825 A * | 5/1989 | Sprung | ................. | A01G 31/02 47/62 C |
| 4,926,585 A * | 5/1990 | Dreschel | ............... | A01G 31/02 47/64 |
| 4,953,322 A * | 9/1990 | Edwards | ............... | A01G 9/047 47/64 |
| 5,285,595 A * | 2/1994 | Shirato | .................. | A01G 31/02 47/62 N |

(Continued)

FOREIGN PATENT DOCUMENTS

EP     2845466 A1 *   3/2015   ............ A01G 31/02

*Primary Examiner* — Peter M Poon
*Assistant Examiner* — Hae Rie Jessica Byun
(74) *Attorney, Agent, or Firm* — Jonathan J. Leahy; Mark W. Homer; Trenton J. Roche

(57) ABSTRACT

The invention described herein comprises a passive plant nutrient delivery system that utilizes a hydrophilic porous tube to transfer a liquid nutrient solution from at least one reservoir to the roots of plants. The plants' roots rest on the exterior surface of the tube, where a combination of capillary force, evapotranspiration from the plant, and some evaporation from the surface of the tube draws the nutrient solution passively from the reservoir, or reservoirs, through the tube. The roots uptake water from the tube as needed, requiring no external power source. A flexible cover envelops plants' roots and the tube, whereby the cover has an opening to allow room for plants to grow. The flexible cover is held in place by a securing means, such as a clamp. Both the cover and the securing means are comprised of a material that can expand, allowing the plants adequate room to grow.

16 Claims, 3 Drawing Sheets

(56) References Cited

U.S. PATENT DOCUMENTS

| | | | | |
|---|---|---|---|---|
| 5,381,626 | A * | 1/1995 | Sherfield | A01G 31/02 47/20.1 |
| 6,178,984 | B1 * | 1/2001 | Amsellem | A01G 27/005 |
| 8,011,853 | B2 * | 9/2011 | Gesser | A01G 29/00 405/39 |
| 10,729,079 | B2 | 8/2020 | Nguyen et al. | |
| 10,945,389 | B1 * | 3/2021 | Levine | A01G 31/02 |
| 2017/0347534 | A1 * | 12/2017 | Weisel | A01G 9/025 |
| 2018/0064041 | A1 * | 3/2018 | Brigham | A01G 9/027 |
| 2019/0045731 | A1 * | 2/2019 | Dixon | A01G 31/042 |
| 2020/0390046 | A1 * | 12/2020 | Weislogel | A01G 27/04 |

\* cited by examiner

PASSIVE POROUS TUBE NUTRIENT DELIVERY SYSTEM

CROSS REFERENCE TO RELATED APPLICATIONS

This application claims the benefit of priority under 35 U.S.C. § 119(e) from U.S. Provisional Patent Application Ser. No. 62/901,421 filed on Sep. 17, 2019, the contents of which are incorporated herein by reference.

ORIGIN OF THE INVENTION

The invention described herein was made in the performance of work under NASA contracts and is subject to the provisions of Section 20135(b) of the National Aeronautics and Space Act, Public Law 111-314, § 3 (124 Stat. 3330, 51 U.S.C. Chapter 201 and 35 U.S.C. § 202), and may be manufactured and used by or for the Government for governmental purposes without the payment of any royalties thereon or therefore.

BACKGROUND OF THE INVENTION

1. Field of the Invention

The present invention relates generally to systems for the delivery of nutrients to plants and more specifically to systems for the delivery of nutrients to plants in microgravity.

2. Description of the Related Art

A primary challenge to growing plants in microgravity is the delivery of adequate air and water to a plant's roots. A lack of gravity force alters convection and thus the behavior of root zone aeration which plants are evolutionarily reliant upon to grow. Current nutrient delivery techniques proposed for space involve the use of a medium for the roots to penetrate, such as arcilite, and power is typically required to actively pump water to the roots. When water is actively pumped to the roots, the user must carefully calibrate the amount of water and nutrients being pumped in order to prevent over-or under-watering that could inhibit plant growth. The current watering technique on the International Space Station using the Vegetable Production System (Veggie) frequently requires astronauts to manually pump water into the pillows with a syringe to sustain the plants.

A previous system designed for growing plants in microgravity and low-gravity environments is disclosed in U.S. Pat. No. 4,926,585 ("Plant Nutrient Delivery System Having a Porous Tubular Member," Dreschel). Specifically, in the prior patent, pumps are used to actively introduce and remove water when attempting to irrigate the plants. Therefore, the system must be operated perfectly in order to provide the correct amount of water. In addition, in the prior patented system, plants were placed inside a rigid tube and on top of a porous cylindrical, hydrophilic membrane that was telescopically inserted into the rigid tube. The plants' roots grow within the rigid tube on the surface of the membrane cylinder (filled with a plant nutrient solution, under a slight negative tension) where they obtain the water and nutrients they need by capillary action while allowing access to air at the surface of the roots. Since plants require a balance of air and water in order to survive and grow, in the original configuration, water was circulated through the membrane cylinder from a reservoir using a positive displacement pump.

In this prior system, control of the water and nutrient solution to the roots is dependent upon the negative tension of the solution within the membrane cylinder that is controlled within the solution loop using a pump and valves. As plants take up nitrates from the nutrient solution, the continuous circulation of the nutrient solution is intended to maintain a balance of nutrients present in the membrane (and active control of pH) for the plants to uptake.

Finally, since the prior invention utilizes an active watering system, it requires a power supply for pumps to actively introduce and remove a nutrient solution. While this is not a significant limitation on Earth as power sources are readily available, in space power supplies are scarce. Therefore, it is always preferable to develop systems that do not require a power source so that the limited power supplies available can be used for more critical life support and propulsion systems.

Due to the aforementioned limitations in the prior art and due to limited power generation capabilities and resources in space, a new design was needed that could both provide for adequate hydration of plants with no external power input requirements.

SUMMARY OF THE INVENTION

The invention described herein comprises a passive plant nutrient delivery system that utilizes a hydrophilic porous tube to transfer a nutrient solution from at least one reservoir to the roots of plants. The plants' roots rest on the exterior surface of the hydrophilic porous tube, where a combination of capillary force, evapotranspiration from the plant, and some evaporation from the surface of the tube draws the nutrient solution passively from the reservoir, or reservoirs, through the tube. The roots uptake water from the tube surface as needed, requiring no external power source to provide the nutrient solution. At the time of development, it was unclear whether this approach would work since the active circulation of the water and nutrient solution was standard in the art. It was previously thought that continuous circulation of the water and nutrient solution was needed to maintain a balance of nutrients in the solution provided through the membrane (and an appropriate pH) for the plants to uptake. However, the passive approach of the disclosed invention may effectively deliver a nutrient solution to the roots of plants growing in a microgravity environment, as the system passively delivers only what the plants need in order to germinate and grow.

The porous tube has a first end, a second end, and an exterior surface, and it is comprised of hydrophilic material to allow for the water and nutrient solutions to passively travel through the porous tube. The porous tube does not require any internal support, and suitable materials for the porous tube include ceramics, plastics, metals, and similar materials known to one of ordinary skill in the art. The aforementioned materials may be inherently hydrophilic, or they could be covered with a hydrophilic coating or similar material to create the hydrophilic properties of the porous tube.

Plants, or the seeds of plants, are placed onto the exterior surface of the hydrophilic porous tube, and as the plants grow, the plants' root systems grow around the exterior surface of the porous tube without penetrating the pores within the tube (ideally the porous tube comprises pores less than 1 micron in diameter). A flexible cover envelops the roots of the plants and the hydrophilic porous tube, whereby the flexible cover has an opening to allow room for multiple plants to emerge and grow. The flexible cover is affixed to the porous tube and the plants' root systems by a flexible securing means, such as a clamp, pin, vice, brace, or other means known to one of ordinary skill in the art. The flexible cover and the flexible securing means are comprised of a material that can expand, allowing the plant roots adequate room to grow.

At least one reservoir is connected in a closed loop to the first end and the second end of the hydrophilic porous tube. The reservoirs contain liquid solutions comprised of water (or deionized water) and plant nutrients required for the type of plants grown in the system. In the preferred embodiment, at least one reservoir can be connected to the porous tube via one or more conduits. Each conduit contains a valve, port, or other mechanism known to one of ordinary skill in the art to purge excess air from the system.

BRIEF DESCRIPTION OF THE DRAWINGS

In the drawings, which are not necessarily to scale, like or corresponding parts are denoted by like or corresponding reference numerals.

DETAILED DESCRIPTION OF THE INVENTION

Figure 1A:
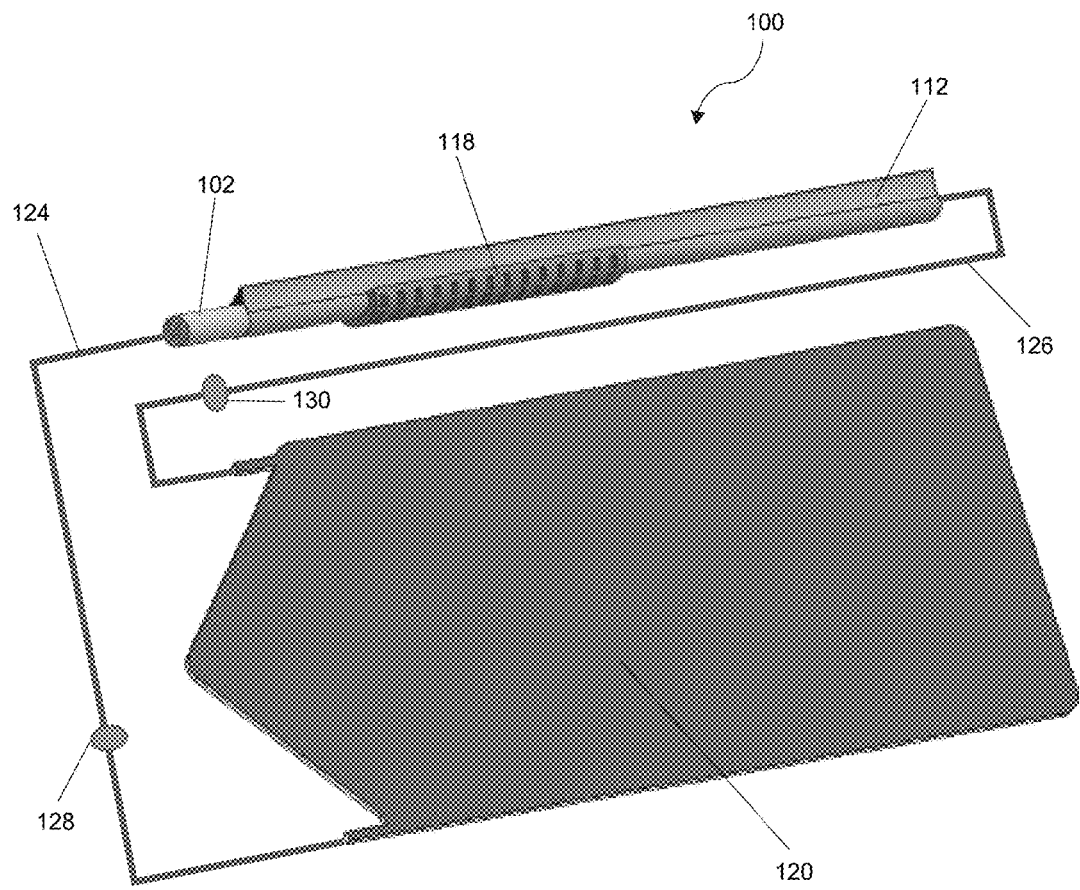
FIG. 1a depicts an embodiment of the present invention.
Figure 1B:
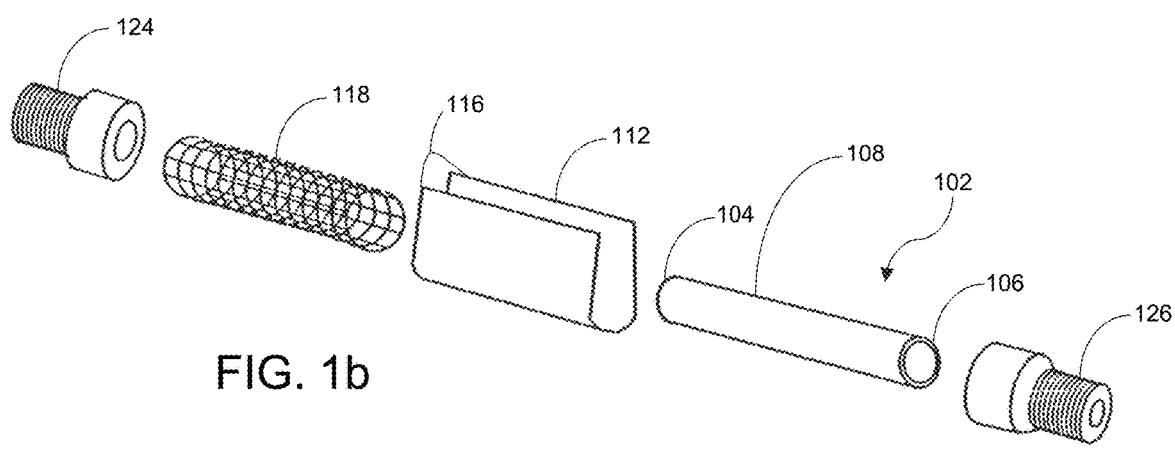
FIG. 1b depicts an exploded view of the components of an embodiment of the present invention.
Figure 2:
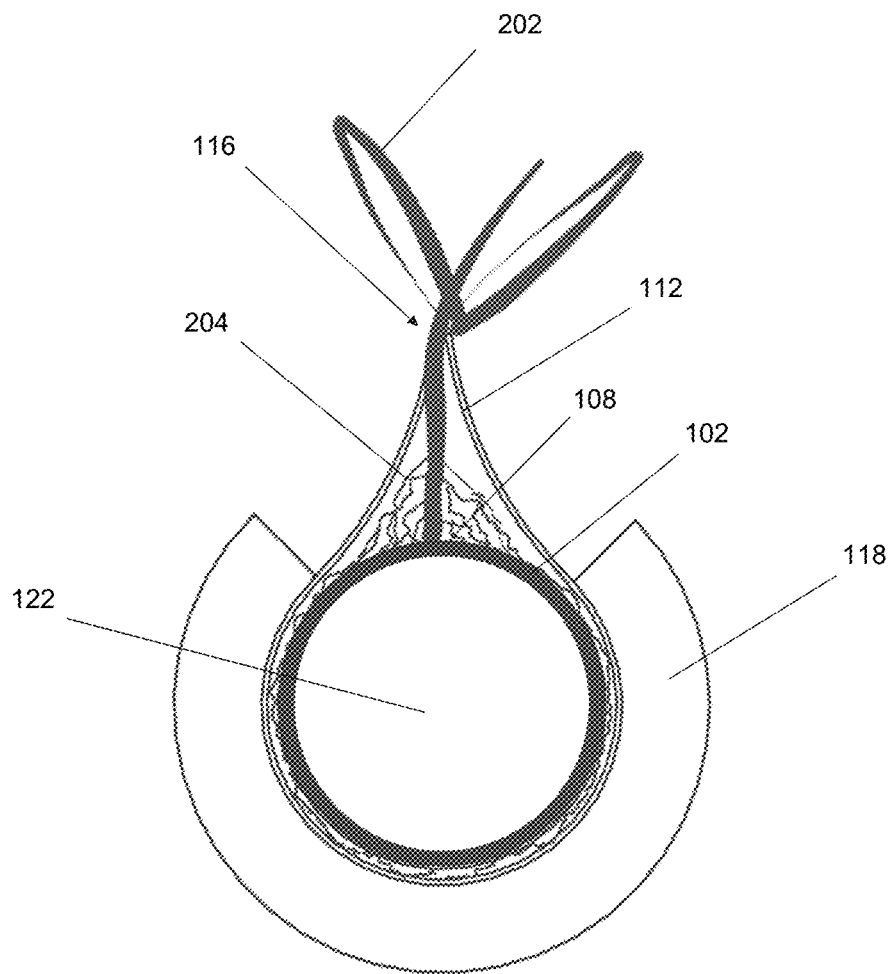
FIG. 2 depicts a cross-section of an embodiment of the present invention

Referring to FIG. 1a, FIG. 1b, and FIG. 2, the present invention is a passive porous tube system 100 for the delivery of nutrients to plants. The passive porous tube nutrient delivery system 100 includes a porous tube 102 having a first end 104, a second end 106, and an exterior surface 108 wherein at least one plant 202 is placed on the exterior surface 108 of the porous tube 102. In FIGS. 1a and 1b, the porous tube 102 is shown with a cylindrical contour. However, it should be noted that the porous tube 102 may have any suitable contouring or relative dimensions based on the needs or requirements of the user (such as the overall size of the system and the species of plants being grown). In the preferred embodiment, the diameter of the porous tube is 2 centimeters, and the length of the porous tube is 1 meter.

The porous tube 102 is comprised of a hydrophilic material to allow for the liquid solution 122 to passively travel through the porous tube. The porous tube 102 does not require any internal support, and suitable materials for the porous tube 102 include ceramics, plastics, metals, and similar materials known to one of ordinary skill in the art. The aforementioned materials may be inherently hydrophilic, or they could be covered with a hydrophilic coating or similar material known to one of ordinary skill in the art to create the hydrophilic properties of the porous tube 102. In the preferred embodiment, the porous tube 102 is comprised of a porous ceramic.

Plants 202 are located on the exterior surface 108 of the porous tube 102. The size of the pores of the porous tube 102 should preferably be small enough so that the roots 204 or root hairs of the plants 202 cannot grow into the pores of the porous tube 102. Therefore, the pores of the porous tube 102 should comprise diameters that are less than the diameter of the plants' 202 roots 204. In the preferred embodiment, the diameter of the pores of the porous tube 102 would be less than 1 micron. As the plants 202 grow, the roots 204 will surround the porous tube 102. The terms "plants" and "seeds" will be used interchangeably throughout to refer to a plant based on its current state of growth and development.

A flexible cover 112 surrounds the roots 204 of the plants 202 and the porous tube 102, whereby the flexible cover 112 has an opening 116 to allow room for the plants 202 to grow. The flexible cover 112 surrounds the porous tube 102 in a manner that allows the roots 204 to grow around the porous tube 102 while allowing the plants 202 to grow up through the opening 116 in the flexible cover 112. This is especially important in the absence of gravity, as plants' 202 roots 204 can potentially grow in many different directions. The flexible cover 112 not only ensures that the plants 202 and their roots 204 stay contained within the system, but the cover 112 also preserves moisture on the porous tube 102, allowing the porous tube 102 to remain wet. In the preferred embodiment, the opening 116 is a slit or similar gap along the entire length of the flexible cover 112, wherein the opening 116 is positioned above the location of the plants 202.

The flexible cover 112 can be made of polyethylene, polypropylene, TEFLON, or equivalent non-porous flexible material. In the preferred embodiment, the flexible cover 112 is comprised of an appropriate non-porous film. The flexible cover 112 is held in place around the porous tube 102 and the plants' roots 204 by a securing means 118, which is preferably adapted to the shape of the porous tube. Although shown in a cylindrical contour similar to the porous tube, it should be noted that the securing means 118 may be a clamp, pin, or other attachment known to one of ordinary skill in the art. The securing means 118 may have any suitable contouring or relative dimensions based on the needs or requirements of the user. The securing means 118 can be made of an appropriate material such as a rigid or somewhat flexible solid material or hinged solid material. In the preferred embodiment, the securing means 118 is comprised of a slotted, cylindrical plastic or polymer mesh that holds the flexible cover in place around the exterior surface 108 of the porous tube 102 while allowing the edges of the cover 112 to emerge. The securing means 118 should not cover the opening 116, as the flexible cover 112 and the securing means 118 must expand to provide adequate room for the plants 202 and the roots 204 to grow while maintaining enough coverage of the porous tube 102 to retain its moist surface properties. While the length of the securing means 118 as depicted in FIG. 1a is not the same length as porous tube 102, in the preferred embodiment, the securing means 118 is approximately the same length as porous tube 102.

At least one reservoir 120 containing a liquid solution 122 comprised of water (or deionized water) and nutrients is connected in a closed loop to the first end 104 and the second end 106 of the porous tube 102. The liquid solution 122 is formulated by the user to meet the needs of the species of plants 202 being grown within the system. The liquid solution 122 may have any suitable ratio of water to nutrients, and it may contain any number of nutrients, minerals, or fertilizers known to one of ordinary skill in the art to optimize growth of the specific species of plants 202. In one embodiment, the liquid solution 122 comprises Hoagland's solution, a nutrient solution known to one of skill in the art. The Hoagland's solution can be diluted using water (or deionized water) so that it adequately meets the needs of the plants selected. The reservoir 120 containing the liquid solution 122 can be any container known to one of ordinary skill in the art, including a bladder, tank, bag, or other vessel for storing fluids. In the preferred embodiment, the reservoir 120 is flexible. When the reservoir 120 has emptied its liquid solution 122 into the porous tube 102, the reservoir 120 can be refilled or replaced with another reservoir 120 filled with liquid solution 122 to continue providing the liquid solution 122 to the plants.

In the preferred embodiment of the invention as shown in FIG. 1*a*, one reservoir 120 can be connected in a closed loop to the porous tube 102 via one or more conduits 124, 126. The reservoir 120 is connected to the first end 104 by a first conduit 124 and to the second end 106 by a second conduit 126. The conduits can be made of any plastic, polymer, rubber, metal, or other similar materials known to one of ordinary skill in the art. In another embodiment, one reservoir is connected to the first end 104 of the porous tube 102, and a second reservoir is connected to the second end 106 of the porous tube 102. In another embodiment, multiple reservoirs are connected in series in a closed loop with the porous tube 102. The conduits 124, 126 can connect to the first end 104 and second end 106 using any water-tight means known to one of skill in the art, including screws or compression fittings.

It is generally preferable to remove all air from the system 100, and as such, one or more valves, ports, or other similar access points known to one of ordinary skill in the art can be added to the conduits 124, 126 to remove air from the system 100. In the preferred embodiment shown in FIG. 1*a*, each conduit 124, 126 comprises at least one valve 128, 130. Referring to FIG. 1*a*, a first valve 128 is located on the first conduit 124 and a second valve 130 is located on the second conduit 126. Air can be removed from each conduit 124, 126 by withdrawing the air through the valve using a device such as a syringe, vacuum, or other gas removal mechanism known to one of skill in the art.

Figure 3:
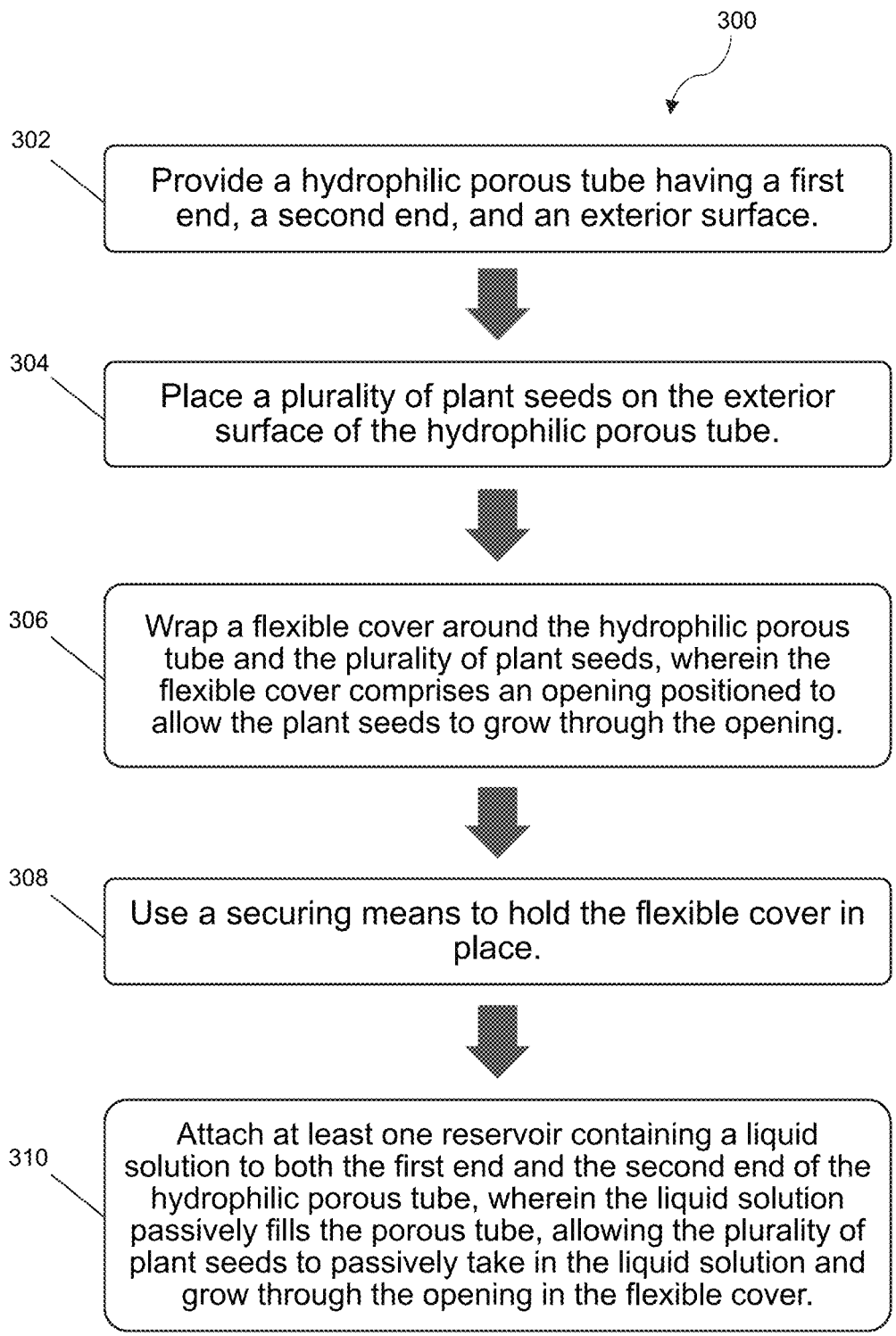
FIG. 3 depicts a flow chart of the steps to use an embodiment of the present invention.

Referring to FIG. 3, the first step 302 of the method 300 for using the previously disclosed system is to provide a hydrophilic porous tube having a first end, a second end, and an exterior surface.

The next step 304 is to place at least one plant seed on the exterior surface of the hydrophilic porous tube. The plants may be of any species selected by a person of ordinary skill in the art and spaced on the exterior surface of the porous tube at distances appropriate to allow such plant species room to grow.

The next step 306 is to wrap a flexible cover as previously disclosed around the hydrophilic porous tube and the plant seeds. The flexible cover holds the plant seeds in place on the porous tube, particularly in microgravity, and the flexible cover preserves moisture on the porous tube. The flexible cover may have any suitable contouring or relative dimensions based on the needs or requirements of the user. In addition, the opening in the flexible cover is positioned in such a way that allows the plant to grow through the opening.

The next step 308 involves using a securing means to hold the flexible cover in place. The securing means is preferably adapted to the shape of the porous tube, and it should be noted that the securing means may be a clamp, pin, vice, brace, or other attachment known to one of ordinary skill in the art. The securing means may have any suitable contouring or relative dimensions based on the needs or requirements of the user.

The final step 310 involves attaching at least one reservoir containing a liquid solution, both as previously disclosed, to both the first end and the second end of the hydrophilic porous tube. When connected, the liquid solution passively fills the porous tube, which allows the plant seeds positioned on the exterior surface of the porous tube to passively take in the liquid solution as needed to grow. As the plants grow, they will preferably grow through the opening in the flexible cover. This attachment of each reservoir can be accomplished in any fashion known to one of ordinary skill in the art. In one embodiment of final step 310, the connection is made by an additional step that provides a first conduit and a second conduit that are both attached to at least one reservoir, as previously disclosed. The user then attaches the reservoir to the hydrophilic porous tube at the first end via the first conduit and at the second end via the second conduit.

In another embodiment of final step 310, the provided first conduit comprises at least one valve, and the provided second conduit comprises at least one valve. As previously disclosed, each valve allows the user to purge air from the system since it is generally preferable to remove all air for the system to operate efficiently.

What is described herein are specific examples of many possible variations on the same invention and are not intended in a limiting sense. The claimed invention can be practiced using other variations not specifically described above.

We claim:

1. A pumpless, passive plant nutrient delivery system for growing plants in a microgravity environment comprising:
    a hydrophilic porous tube having a first end, a second end, and an exterior surface wherein at least one plant, having roots, is located on the exterior surface of the hydrophilic porous tube;
    a flexible cover wrapped around the hydrophilic porous tube positioned sufficiently against the exterior surface of the hydrophilic porous tube to retain moisture on the exterior surface and to guide the roots to grow around the hydrophilic tube but expandable to allow room for the roots, wherein the flexible cover comprises an opening that is capable of expanding to allow adequate room for the at least one plant to grow and is held in place by a securing means; and
    at least one reservoir containing a liquid solution connected to the hydrophilic porous tube at the first end and at the second end and positioned below the hydrophilic porous tube to form a closed loop wherein the liquid solution is passively provided to the hydrophilic porous tube from the at least one reservoir.

2. The pumpless, passive plant nutrient delivery system of claim 1, wherein the at least one reservoir is connected to the hydrophilic porous tube at the first end via a first conduit and at the second end via a second conduit.

3. The pumpless, passive plant nutrient delivery system of claim 2, wherein the first conduit and the second conduit each further comprise a valve, whereby each valve can be used to purge air from the system.

4. The pumpless, passive plant nutrient delivery system of claim 1, wherein the plants draw the liquid solution through the tube wherein the plants uptake the liquid solution as needed.

5. The pumpless, passive plant nutrient delivery system of claim 1, wherein the pores in the hydrophilic porous tube comprise diameters less than 1 micron.

6. The pumpless, passive plant nutrient delivery system of claim 1, wherein the pores in the hydrophilic porous tube comprise diameters that are less than the diameter of the at least one plant's roots.

7. The pumpless, passive plant nutrient delivery system of claim 1, wherein the hydrophilic porous tube comprises ceramic.

8. The pumpless, passive plant nutrient delivery system of claim 1, wherein the hydrophilic porous tube comprises plastic.

9. The pumpless, passive plant nutrient delivery system of claim 1, wherein the securing means comprises a flexible securing means.

10. The pumpless, passive plant nutrient delivery system of claim 1, wherein the securing means comprises a mesh wrap.

11. The pumpless, passive plant nutrient delivery system of claim 1, whereby the liquid solution comprises deionized water and nutrients required for plant growth.

12. The pumpless, passive plant nutrient delivery system of claim 1, whereby the liquid solution comprises Hoagland's solution.

13. A method of using a pumpless, passive plant nutrient delivery system in microgravity, comprising the steps of:
   providing a hydrophilic porous tube having a first end, a second end, and an exterior surface;
   placing at least one plant seed on the exterior surface of the hydrophilic porous tube;
   wrapping a flexible cover around the hydrophilic porous tube and the at least one plant seed, wherein the flexible cover comprises an opening positioned to allow the plant seeds to grow through the opening and positioned to ensure plant roots emanating from the plant seeds grow substantially around and against the exterior surface of the hydrophilic porous tube and so the exterior surface of the hydrophilic porous tube retains moisture;
   using a securing means to hold the flexible cover in place; and
   attaching at least one reservoir containing a liquid solution to both the first end and the second end of the hydrophilic porous tube positioned below the hydrophilic porous tube, wherein the liquid solution is drawn through the hydrophilic porous tube by the plants, allowing the at least one plant seed to passively take in the liquid solution and grow through the opening in the flexible cover.

14. The method of using the pumpless, passive plant nutrient delivery system in microgravity as recited in claim 13, wherein the step of attaching at least one reservoir containing the liquid solution to both the first end and the second end of the hydrophilic porous tube further comprises:
   providing a first conduit and a second conduit; and
   attaching the at least one reservoir to the hydrophilic porous tube at the first end directly via the first conduit and at the second end directly via the second conduit.

15. The method of using the pumpless, passive plant nutrient delivery system in microgravity as recited in claim 14, wherein the step of providing the first conduit and the second conduit further comprises providing the first conduit with at least one valve and the second conduit with at least one valve.

16. The method of using the pumpless, passive plant nutrient delivery system in microgravity as recited in claim 15, further comprising the step of purging air from the system using at least one of the valves on each conduit following the step of attaching at least one reservoir to both the first end and the second end of the hydrophilic porous tube.

\* \* \* \* \*